April 12, 1949.  C. T. GATES  2,467,025
HAY BALER ATTACHMENT
Filed April 20, 1945
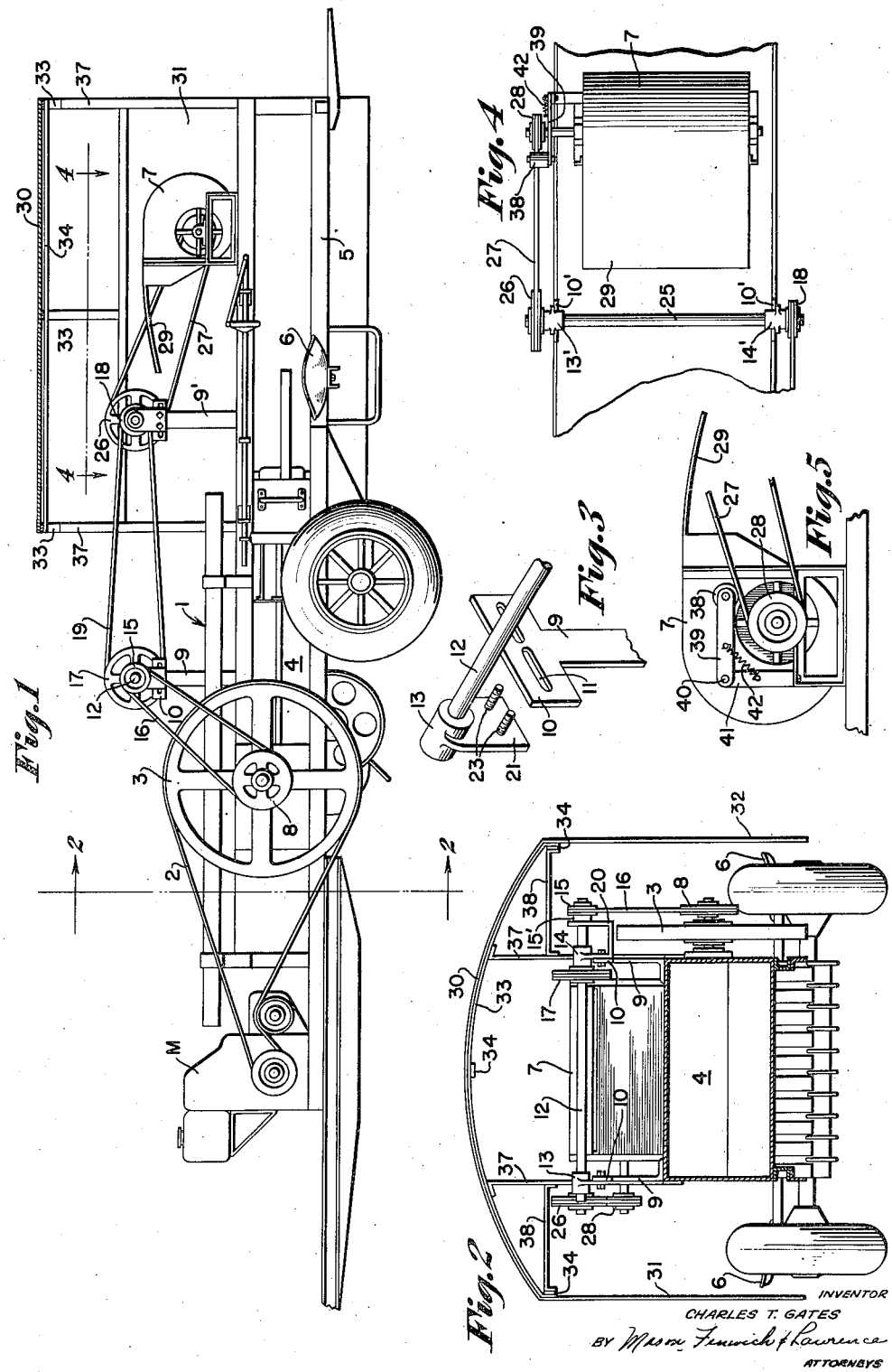
INVENTOR
CHARLES T. GATES
BY Mason Fenwick & Lawrence
ATTORNEYS Patented Apr. 12, 1949

2,467,025

UNITED STATES PATENT OFFICE 2,467,025

HAY BALER ATTACHMENT

Charles T. Gates, Wendell, Idaho

Application April 20, 1945, Serial No. 589,387

7 Claims. (Cl. 100—19)

My invention relates to improvements in baling-machines and has for its object to provide means for blowing the dust, incident to the baling operation, away from the men who are engaged in tying wires around the bales as they emerge from the forward exit of the compression-chamber. The advantage of this improvement is that it prevents the dust from hanging about the men and interfering with their work by impairing their sight and respiration. Heretofore this dust has caused serious work stoppages to permit the men to clear their eyes and respiratory organs and to allow the dust to pass away. With these and other objects and advantages in view my invention consists of the novel construction and arrangement of parts hereinafter shown and described.

In the accompanying drawings, illustrating my invention,

Figure 1 is a side elevation of a typical hay-baling machine with the canopy, which is a part of the invention, shown in section longitudinally;

Figure 2 is a vertical, transverse sectional view on the line 2—2 of Figure 1, looking in the direction of the arrows, and, Figure 3 is an enlarged detail exploded perspective view of the bearing-support bracket for one of the jack-shafts.

Figure 4 is a fragmentary horizontal cross section taken on line 4—4 of Figure 1; and Figure 5 is a fragmentary side elevation of the blower unit from the side opposite to that shown in Figure 1.

Like reference numerals in the description and drawings designate like parts of construction.

1 is an ordinary type of hay-baling machine operated by a motor M and the hay is fed to the machine from beneath by an automatically-operated, rake-like scoop. From a pulley, rotated by the motor, a belt 2 drives the main pulley 3 which operates the mechanism for feeding hay to the compression-chamber 4 and there compresses it into bale shape. Thence the bales emerge through an exit and are carried to the point on the ways 5 where oppositely-disposed seats 6 are provided for the men who pass wires from one to the other and around the bales after which the ends thereof are fastened together to tie the bales up in the size and shape in which they emerge from the compression-chamber 4.

Over and adjacent the end of the frame of the ways 5 is installed a dust-blower 7 which is operated indirectly from the motor M by a pulley 8 mounted on the shaft of pulley 3. Two oppositely-disposed, vertical standards 9 are fastened at their feet to the top of the baling-machine and at their tops these standards are formed with lateral extensions to form a head-plate 10 which is provided with a horizontal slot 11. A transverse, rotatable jack-shaft 12 is mounted in adjustable bearings 13 and 14 and extends some distance beyond the right-hand standard on the outside. Each of the bearings 13 and 14 are formed with lugs 21 adjustably associated with the head plates by bolts 23. On the end of this extension of shaft 12 is fixedly mounted a pulley 15 which is connected by transmission-belt 16 with the pulley 8. To provide an adequate support for this extended part of shaft 12 and pulley 15 the bearing 14 is modified as illustrated in Figure 2 by having an outwardly directed bracket 20 carrying a supplemental bearing 15'. On the other side of this right hand standard and adjacent thereto is another pulley 17 fixed on shaft 12 which is connected with a pulley 18 by the belt 19. By reason of the provision of the slotted head plates 10 on the standards 9—9 and the lugs 21 on the bearings 13 and 14 provision is made for the adjustment of shaft 12 toward or away from the shaft of the baler machine, thus permitting the tightening or loosening of belt 16. By loosening the nuts on bolts 21 and 23 and moving the adjacent bearings in either a forward or backward direction undesirable slack in the transmission belts 16 and 19 can be taken up.

The pulley 18 is fixedly mounted on a shaft 25 arranged parallel with shaft 12 and similarly supported by vertical standards 9—9 which carry similarly constructed adjustable bearings 13' and 14'. On the opposite end of shaft 25 is fixed a pulley 26 which is connected by a belt 27 with a pulley 28 on the shaft of blower 7.

An idler pulley 38 is arranged to maintain the belt 27 taut at all times, this idler pulley being mounted on an arm 39 pivoted as at 40 to a standard 41, the arm 39 being connected to the arm 41 by a spring 42. With this provision for the automatic tightening of belt 27 it will be apparent that shaft 25 can be adjusted to the right or to the left by the adjustment of bearings 13', 14', similarly with the adjustment of shaft 12 so that belt 19 can be tightened or loosened in conjunction with belt 16, any slack in belts 16 and 19 being taken up by such adjustment of the shafts 12 and 25 and absorbed by belt 27 in the manner indicated.

The blower 7 is positioned with its outlet opening pointed in the direction of the compression-chamber of the baler 4 and has a downwardly-slanted deflector 29, above the said opening, which directs the current of air between the men on the seats 6 and beyond, thus carrying the dust away from their vicinity.

In conjunction with the blower, the baling machine is provided with a canopy 30 made of fabric or other suitable material which extends longitudinally of the machine from a point above the compression-chamber of the baler to the end of the ways 5. It is preferably arched and extends transversely over the machine and far enough beyond each side to fully cover and protect the seats 6. This canopy is provided with drop curtains 31 and 32 at its end and sides to enclose the workers when the machine is in operation. A light frame to support the canopy is attached to the baling machine and it consists of transverse, arched ribs 33 and longitudinal ribs 34. This canopy is supported by front and rear vertical standards 37. These standards are braced by the cross-stays 38. It will be understood that all or parts of the canopy frame and its supports may be constructed of metal or other suitable material and the whole frame-work with canopy may be made removable by detachably securing the feet of the supporting standards 37 to the baling-machine.

Having thus fully described my invention, what I claim as new and desire to secure by Letters Patent of the United States is:

1. The combination with a motor-operated baling-machine provided with compression-chamber and ways to discharge the bales after they emerge from the said chamber and are tied in shape; of a blower having its induction end positioned to draw in dust free air; and a canopy supported on the baling-machine and enclosing the blower and compression-chamber and adapted to direct the blower-driven air and dust, incident to the baling operation, out at one end of the canopy.

2. The combination with a motor-operated baling-machine provided with a compression-chamber and ways to discharge the bales after they emerge from the said chamber and are tied in shape; of a blower operated by the motor of the baling-machine and adapted to direct a current of air toward the compression-chamber and its exit; a canopy supported over the blower and compression-chamber; and drop-curtains attached to the sides of the canopy and adapted, in conjunction with the canopy to direct the blower driven air and dust, incident to the baling operation, out from under the canopy when the baling-machine is in operation.

3. The combination with a motor-operated baling-machine provided with a compression-chamber and ways to discharge the bales after they emerge from the said chamber and are tied in shape; of a blower located near the front of said ways and adapted to direct a current of air towards the compression-chamber and its exit; means comprising longitudinally adjustable intermediate pulleys and transmission-belts for operating a pulley on the fan-shaft of the blower from a pulley on the rotatable shaft of the motor of the baling-machine; and a canopy enclosing the blower and compression-chamber and adapted to direct the blower-driven dust, incident to the baling operation, out from under the canopy toward the compression chamber.

4. The combination with a motor-operated baling-machine provided with a compression-chamber and ways to discharge the bales after they emerge from the said chamber and are tied in shape; of a blower located near the front of said ways and adapted to direct a current of air toward the compression-chamber and its exit; means comprising longitudinally adjustable intermediate pulleys and transmission-belts for operating a pulley on the fan-shaft of the blower from a pulley on the rotatable shaft of the motor of the baling-machine; rotatable jack-shafts carrying said intermediate pulleys and supported on upright standards attached to the baling-machine; bearings for said jack-shafts provided with depending members adapted to be removably secured to the upper ends of the standards and to be adjustable longitudinally; and a canopy over the blower and compression-chamber adapted to direct the blower-driven dust, incident to the baling operation, out from under the canopy at the compression chamber end thereof.

5. In a motor operated baling machine provided with compression chamber and longitudinal ways to discharge bales after they emerge from said chamber and are tied in shape; the combination of a blower and means carried by the baling machine for directing the air from said blower past the faces of the operators stationed on the machine.

6. In a motor operated baling machine provided with compression chamber and longitudinal ways to discharge the bales after they emerge from the said chamber and are tied in shape; the combination of a blower having its induction end positioned to draw in dust-free air, stations for operators carried by the baler and means carried by the baling machine forming a conduit to direct the dust-free air from the blower past the faces of the operators at said stations.

7. In combination with a machine or farm implement having an operator station located in a position which is usually surrounded by dust or dirt laden atmosphere as a result of the operation of said machine, means defining a conduit enveloping at least the head of an operator at said operator station, and means for delivering a draft of air through said conduit to effect a plenum zone therein adjacent the head of the operator, excluding dust and dirt laden atomsphere from said zone.

CHARLES T. GATES.

REFERENCES CITED

The following references are of record in the file of this patent:

UNITED STATES PATENTS

| Number | Name | Date |
| --- | --- | --- |
| 313,960 | Sherman | Mar. 17, 1885 |
| 423,121 | Brown et al. | Mar. 11, 1890 |
| 1,482,495 | Westhaver | Feb. 5, 1924 |
| 2,266,332 | Pugsley | Dec. 16, 1941 |